United States Patent [19]

Williams

[11] Patent Number: 5,057,935
[45] Date of Patent: Oct. 15, 1991

[54] METHOD FOR CONFIRMATION OF DOCUMENT RECIPIENT IN A DATA PROCESSING SYSTEM

[75] Inventor: Marvin L. Williams, Lewisville, Tex.

[73] Assignee: IBM Corporation, Armonk, N.Y.

[21] Appl. No.: 534,813

[22] Filed: Jun. 7, 1990

[51] Int. Cl.⁵ .......................................... H04M 11/00
[52] U.S. Cl. .................................................. 358/402
[58] Field of Search ................ 358/402, 403, 404, 405

[56] References Cited

U.S. PATENT DOCUMENTS

| | | | |
|---|---|---|---|
| 4,607,289 | 8/1986 | Kurokawa | 358/402 |
| 4,727,429 | 2/1988 | Ueno | 358/405 |
| 4,918,722 | 4/1990 | Duehren et al. | 358/403 |
| 4,941,170 | 7/1990 | Herbst | 358/402 |
| 4,967,288 | 10/1990 | Mitzutori et al. | 358/404 |

Primary Examiner—Stephen Brinich
Attorney, Agent, or Firm—Andrew J. Dillon

[57] ABSTRACT

A method is disclosed for efficiently managing the distribution of multiple documents within a data processing system. In many modern data processing systems an intended document recipient may selectively permit one or more alternate recipients to receive documents transmitted to the intended recipient. In accordance with the method of the present invention, a confirmation of delivery status log entry is created upon the transmittal of a document to an intended recipient. Thereafter, the data processing system automatically determines the identity of the actual recipient of the document and generates a confirmation of delivery message which includes an identification of the actual recipient of that document. This confirmation of delivery, as well as the identity of the actual recipient, may be stored within the confirmation of delivery status log so that the originator of the document may, be reference thereto, accurately determine the identity of the actual recipient who provoked the confirmation of delivery message. In a preferred embodiment of the present invention, a document may be transmitted to a plurality of receceipients and the originator may be permitted to require confirmation of the identity of the actual recipient for only selected ones of that plurality of recipients.

14 Claims, 2 Drawing Sheets

METHOD FOR CONFIRMATION OF DOCUMENT RECIPIENT IN A DATA PROCESSING SYSTEM

BACKGROUND OF THE INVENTION

1. Technical Field

The present invention relates in general to methods for improving data processing systems and in particular to methods for efficiently managing the distribution of multiple documents within a data processing system. Still more particularly, the present invention relates to methods for permitting an originator of an electronic document to confirm the identity of the actual recipient of that document.

2. Description of the Related Art

Electronic mail or "E-Mail" systems are well known in the prior art. By "electronic mail" what is meant is a system whereby messages may be sent and/or received between two computers or work stations. For example, two computers coupled together by a Local Area Network (LAN) may be utilized to communicate detailed messages between the operators thereof. Similarly, two intelligent work stations coupled to a central processor may be utilized to transmit or receive electronic mail messages by utilizing well known communication techniques.

Well known electronic mail systems do provide an enhanced method of communication which may be utilized in situations were all parties in the communication loop are not on-line at all times, there are certain disadvantages inherent in such systems. For example, it is often desirable for the center of an item of electronic mail to determine with a high degree of certainty whether or not the item has been electronically transmitted to the correct location.

This particular problem has been addressed in select electronic mail systems which provide a confirmation notification when a distribution is "delivered" or placed in a recipient's "in-basket." While this technique represents an improvement over previously known electronic mail systems, it is often desirable to provide the center with a higher degree of information regarding the activities of an electronic mail recipient.

For example, in selected electronic data processing systems a first user may designate a second user or so-called "affinity" user who shall thereafter be permitted to access electronic mail items which have been transmitted to the first user.

Similarly, it is possible utilizing known state-of-the-art electronic mail distribution systems for a first user to "forward" all electronic mail delivered to that user to a second user. This is generally accomplished purposefully due to the first user being absent for some sustained period of time or otherwise being incapable of, or unwilling, to respond to electronic mail.

Therefore, it should be obvious that a need exists for an electronic mail system which permits an originator of an electronic document to ascertain with a high degree of certainty the identity of the actual recipient of an electronic document which has been transmitted by that originator.

SUMMARY OF THE INVENTION

It is therefore one object of the present invention to provide a method of improving data processing systems.

It is another object of the present invention to provide a method for efficiently managing the distribution of multiple documents within a data processing system.

It is yet another object of the present invention to provide a method for permitting an originator of an electronic document to confirm with a high degree of certainty the identity of the actual recipient of an electronic document.

The foregoing objects are achieved as is now described. The method of the present invention permits the efficient management of the distribution of multiple documents within a data processing system. In many modern data processing systems an intended document recipient may selectively permit one or more alternate recipients to receive documents transmitted to the intended recipient. In accordance with the method of the present invention, a confirmation of delivery status log entry is created upon the transmittal of a document to an intended recipient. Thereafter, the data processing system automatically determines the identity of the actual recipient of the document and generates a confirmation of delivery message which includes an identification of the actual recipient of that document. This confirmation of delivery, as well as the identity of the actual recipient, may be stored within the confirmation of delivery status log so that the originator of the document may, by reference thereto, accurately determine the identity of the actual recipient who provoked the confirmation of delivery message. In a preferred embodiment of the present invention, a document may be transmitted to a plurality of recipients and the originator may be permitted to require confirmation of the identity of the actual recipient for only selected ones of that plurality of recipients.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
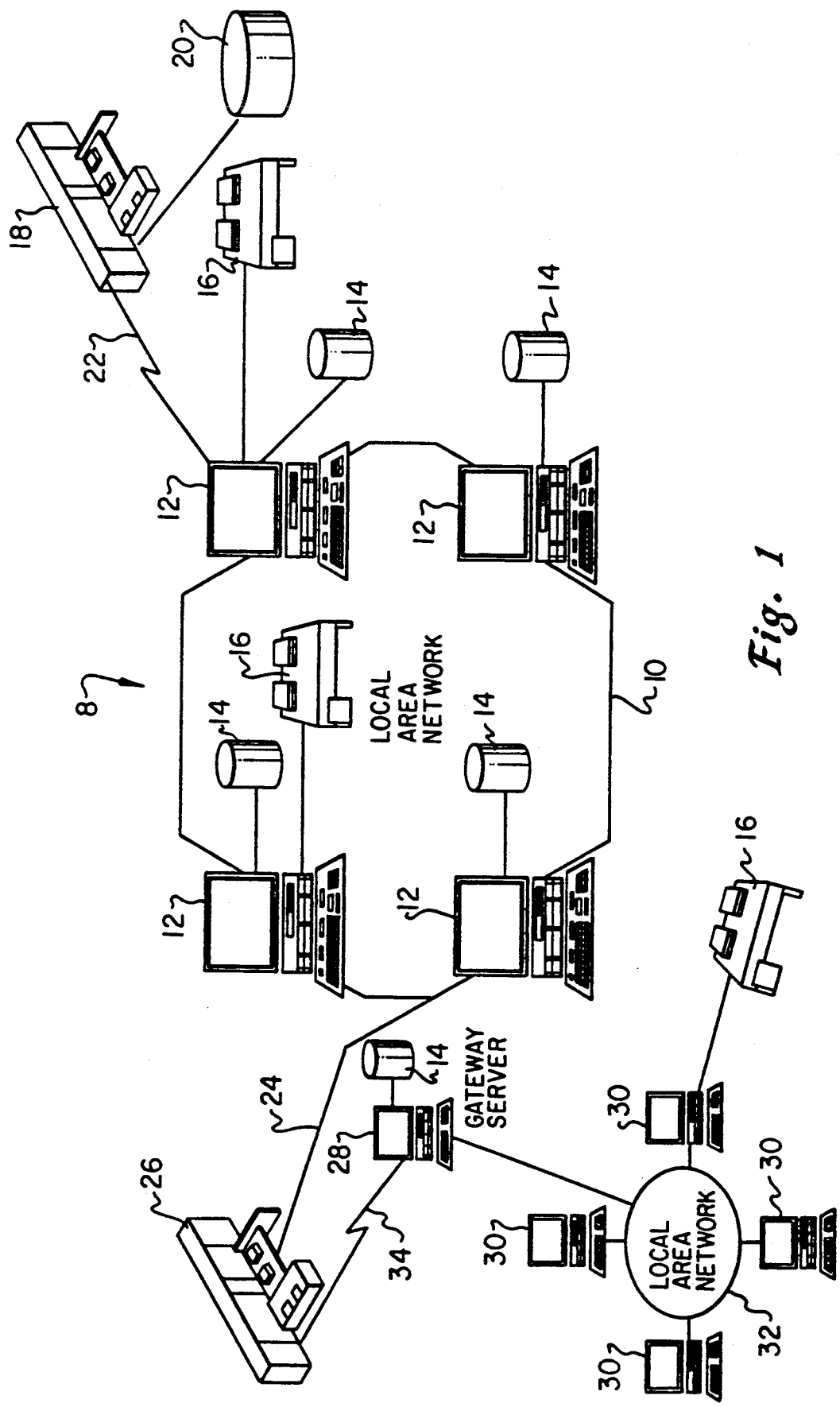
FIG. 1 is a pictorial representation of a distributed data processing system which may be utilized to implement the method of the present invention.

With reference now to the figures and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within data processing system 8, in accordance with the method of the present invention. In a manner well known in the prior art, each such data object or document may be stored within a storage device 14 which is associated with a Resource Manager or Library Service, which is responsible for maintaining and updating all resource objects associated therewith.

Still referring to FIG. 1, it may be seen that data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10 may be coupled via communications controller 27 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data objects or documents may be stored within storage device 20 and controlled by mainframe computer 18, as Resource Manager or Library Service for the data objects and documents thus stored. Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to transmit a data object or document from one portion of data processing network 8 to a user within another portion of data processing network 8. However, as discussed above, modern electronic data processing networks often permit a user to designate a second user to receive electronic documents which have been transmitted to the first user. This may be accomplished by designating a so-called "affinity" user who may access the identical memory space which may be accessed by the first user. Similarly, an intended recipient of an electronic document may, within the capability of data processing network 8, elect to automatically forward any electronic document transmitted to that user to a second designated user in a manner similar to telephonic "call-forwarding." Therefore, it should be obvious that a need exists for a method whereby the originator of an electronic document which has been transmitted via data processing network 8 may ascertain with a high degree of certainty the actual identity of the recipient of that document.

Figure 2:
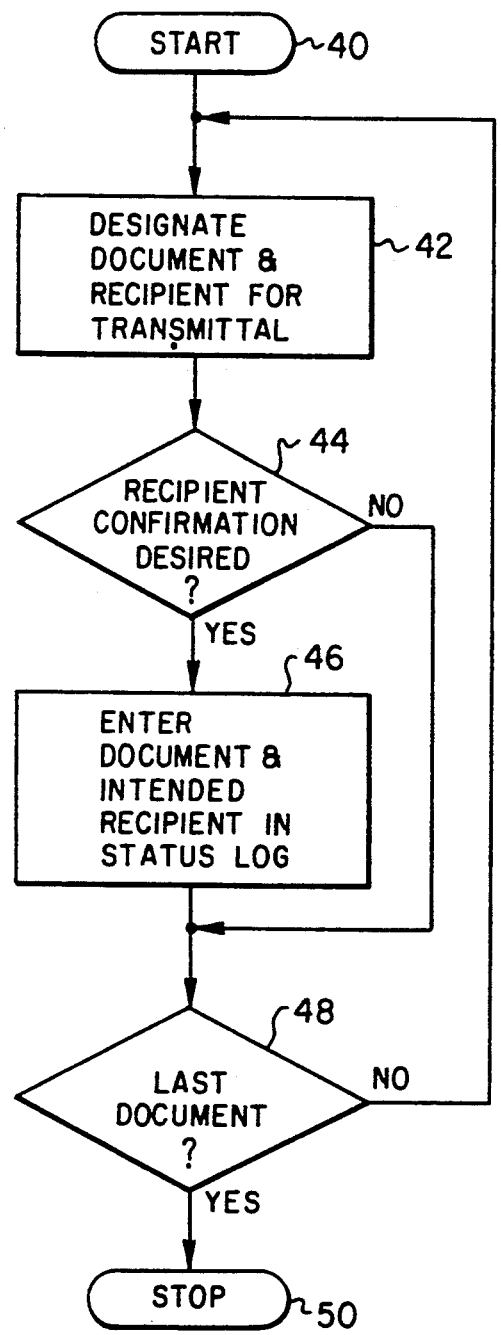
FIG. 2 is a high level flow chart depicting the designation of a selected electronic document for confirmation of the identity of the actual recipient thereof.

Referring now to FIG. 2, there is depicted a high level flow chart which illustrates the designation of a selected electronic document for confirmation of the actual identity of the recipient thereof. As is illustrated, the process begins at block 40 and thereafter passes to block 42 which depicts the designation of a document and the designation of the recipient(s) of that document for transmittal via data processing network 8 (see FIG. 1). Next, the process passes to block 44 wherein a determination is illustrated which indicates whether or not the originator of the transmitted document desires a confirmation of the identity of the recipient of that document.

In the event the originator of the electronic document to be transmitted does not desire a confirmation of the identity of the recipient of that document, the process passes to block 48 wherein a determination is illustrated as to whether or not the document being processed is the last document to be transmitted. If not, the procedure returns to block 42 in an iterative manner. In this fashion, an originator of electronic documents may selectively determine which documents of a plurality of documents require a confirmation of the identity of the actual recipient thereof. In the event the document under consideration within block 48 is the last document to be transmitted, the procedure passes to block 50 and terminates.

Referring again to block 44, in the event the originator of an electronic document has designated the document under consideration as a document for which confirmation of the actual identity of the recipient is desired, the procedure passes to block 46. Block 46 depicts the entering of the document identity and the identity of the intended recipient in a status log. Those skilled in the art will appreciate that such status logs provide an efficient manner whereby the status of a large number of documents may be maintained. Thereafter, as above, block 48 is utilized to illustrate a determination of whether or not any additional documents must be processed. In the event the last document has been processed, the procedure again terminates, as illustrated in block 50.

Figure 3:
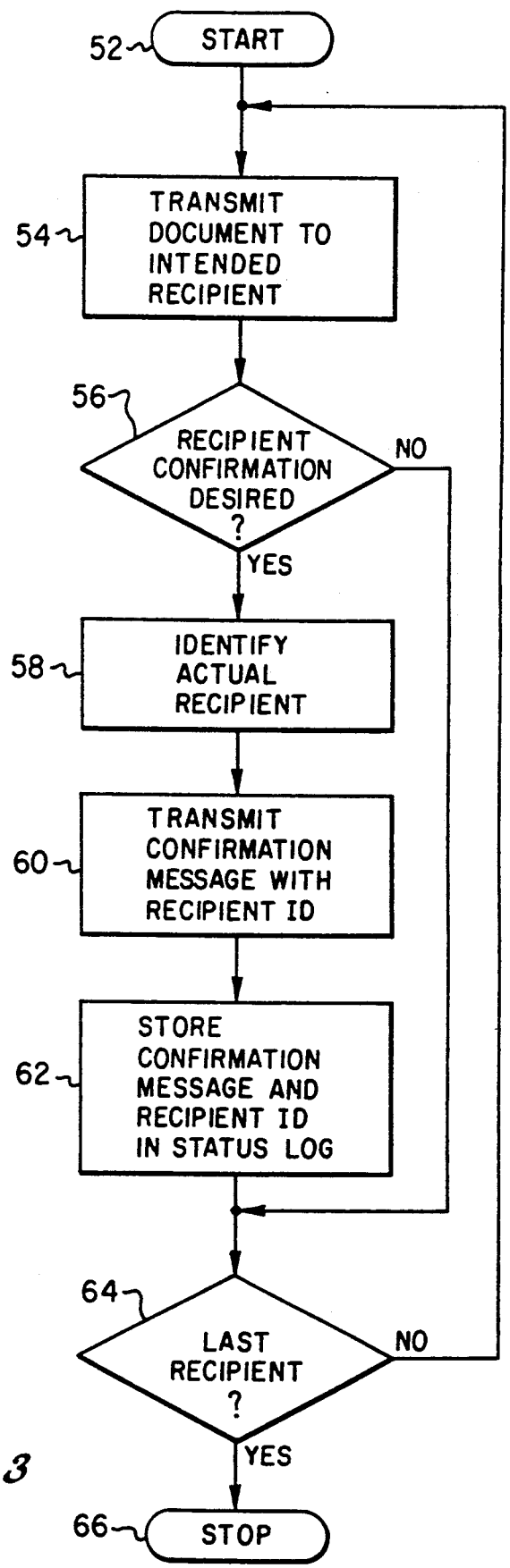
FIG. 3 is a high level flow chart depicting the transmittal of a selected electronic document and the confirmation of the identity of the actual recipient thereof.

With reference now to FIG. 3, there is depicted a high level flow chart which illustrates the transmittal of a selected electronic document and the confirmation of the actual identity of the recipient thereof, in accordance with the method of the present invention. As is depicted, the process begins at block 52 and thereafter passes to block 54 which illustrates the transmittal of a designated document to an intended recipient, via data processing network 8 (see FIG. 1).

Next, block 56 illustrates a determination of whether or not the document transmitted has been designated by the originator thereof as requiring confirmation of the identity of the actual recipient thereof. If not, the process passes to block 64 wherein a determination is made as to whether or not additional recipients exist to whom the current document must be transmitted. If not, the process returns to block 54, in an iterative fashion, and the selected document is transmitted to the next intended recipient on the addressee list. However, in the event the intended recipient currently under consideration is the last recipient for the selected document, the process passes to block 66 and terminates.

Referring again to block 56, in the event the originator of the electronic document under consideration has indicated his desire to receive a confirmation of the identity of the recipient thereof, block 58 illustrates the identification of the actual recipient of the document. This may be accomplished by causing the mail server, at the location within data processing network 8 of the recipient, to generate an indication of the unique identity of the recipient to whom the selected document was delivered.

Thereafter, block 60 illustrates the transmission of a confirmation of delivery message, along with the identification of the recipient who provoked the confirmation of delivery message. This confirmation message and recipient identification are then stored within the confirmation of delivery status log, as depicted in block 62.

In this manner, the originator of the selected electronic message may simply refer to the status log to determine the identity of the actual recipient of an electronic document. In this manner, the originator of an electronic message may require the identity of the actual recipient of any electronic message to be determined and stored within a status log so that any confusion which may arise as a result of affinity users or message forwarding may be simply and easily clarified.

After storing the confirmation of delivery message and the identification of the actual recipient of the electronic message, the process again returns to block 64 to determine whether or not additional recipients exist on the addressee list for the document being transmitted. If no additional recipients are listed, the process terminates, as depicted in block 66. However, in the event additional recipients are listed for the document in question, the process returns iteratively to block 54 to transmit the document to the next recipient on the addressee list.

As those skilled in the art will appreciate upon reference to the foregoing, the method of the present invention permits an originator of an electronic document to transmit that document to a plurality of recipients, who are identified within an addressee listing. Thereafter, the originator may require confirmation of the actual identity of the recipient who triggered the confirmation of delivery message for each of the listed intended recipients.

While the invention has been particularly shown and described with reference to a preferred embodiment, it will be understood by those skilled in the art that various changes in form and detail may be made therein without departing from the spirit and scope of the invention.

I claim:

1. A method for efficiently managing the distribution of multiple documents in a data processing system wherein an intended recipient user may permit an alternate user to receive a transmitted document, said method comprising the steps of:
   transmitting a selected document within said data processing system from an originator to an intended recipient, wherein said intended recipient may designate an alternate user to receive said selected document;
   determining the actual identity of the recipient of said selected document; and
   automatically transmitting a confirmation of delivery message to said originator of said selected document which uniquely identifies said actual recipient.

2. The method for efficiently managing the distribution of multiple documents within a data processing system wherein an intended recipient user may permit an alternate user to receive a transmitted document according to claim 1, further including the step of creating a confirmation of delivery status log for storing an indication of a transmittal of any document for which confirmation of delivery is desired.

3. The method for efficiently managing the distribution of multiple documents within a data processing system wherein an intended recipient user may permit an alternate user to receive a transmitted document according to claim 2, further including the step of storing said confirmation of delivery message which uniquely identifies said actual recipient within said confirmation of delivery status log.

4. The method for efficiently managing the distribution of multiple documents within a data processing system wherein an intended recipient user may permit an alternate user to receive a transmitted document according to claim 1, wherein said step of transmitting a confirmation of delivery message to said originator of said selected document which uniquely identifies said actual recipient further comprises the step of automatically transmitting said confirmation of delivery message in response to a receipt of said selected document.

5. The method for efficiently managing the distribution of multiple documents within a data processing system wherein an intended recipient user may permit an alternate user to receive a transmitted document according to claim 1, wherein said step of transmitting a selected document within said data processing system from an originator to an intended recipient comprises the step of transmitting said selected document to a plurality of intended recipients.

6. The method for efficiently managing the distribution of multiple documents within a data processing system wherein an intended recipient user may permit an alternate user to receive a transmitted document according to claim 5, wherein said step of determining the actual identity of the recipient of said document comprises the step of automatically determining the actual identity of the recipient of said selected document for selected ones of said plurality of intended recipients.

7. A data processing system for efficiently managing the distribution of multiple documents in said data processing system wherein an intended recipient user may permit an alternate user to receive a transmitted document, said data processing system comprising:
   means for transmitting a selected document within said data processing system from an originator to an intended recipient, wherein said intended recipient may designate an alternate user to receive said selected document;
   means for determining the actual identity of the recipient of said selected document; and
   means for automatically transmitting a confirmation of delivery message to said originator of said selected document which uniquely identifies said actual recipient.

8. The data processing system for efficiently managing the distribution of multiple documents in said data processing system wherein an intended recipient user may permit an alternate user to receive a transmitted document according to claim 7, further including means for creating a confirmation of delivery status log for storing an indication of a transmittal of any document for which confirmation of delivery is desired.

9. The data processing system for efficiently managing the distribution of multiple documents in said data processing system wherein an intended recipient user may permit an alternate user to receive a transmitted document according to claim 8, further including means for storing said confirmation of delivery message which uniquely identifies said actual recipient within confirmation of delivery status log.

10. The data processing system for efficiently managing the distribution of multiple documents in said data processing system wherein an intended recipient user may permit an alternate user to receive a transmitted document according to claim 7, wherein said means for transmitting a confirmation of delivery message to said originator of said selected document which uniquely identifies said actual recipient further comprises means for automatically transmitting said confirmation of delivery message in response to a receipt of said selected document.

11. The data processing system for efficiently managing the distribution of multiple documents in a data processing system wherein an intended recipient user may permit an alternate user to receive a transmitted document according to claim 7, wherein said means for transmitting a selected document within said data processing system from an originator to an intended recipient comprises means for transmitting said selected document to a plurality of intended recipients.

12. The data processing system for efficiently managing the distribution of multiple documents in a data processing system wherein an intended recipient user may permit an alternate user to receive a transmitted document according to claim 11, wherein said means for determining the actual identity of the recipient of said document comprises means for automatically determining the actual identity of the recipient of said selected document for selected ones of said plurality of intended recipients.

13. A data processing program for efficiently managing the distribution of multiple documents in a data processing system wherein an intended recipient user may permit an alternate user to receive a transmitted document, said data processing program comprising:
  means for transmitting a selected document within said data processing system from an originator to an intended recipient, wherein said intended recipient may designate an alternate user to receive said selected documents;
  means for determining the actual identity of the recipient of said selected document; and
  means for automatically transmitting a confirmation of delivery message to said originator of said selected document which uniquely identifies said actual recipient.

14. A data processing program for efficiently managing the distribution of multiple documents in a data processing system wherein an intended recipient user may permit an alternate user to receive a transmitted document according to claim 13, further including means for creating a confirmation of delivery status log for storing an indication of a transmittal of any document for which confirmation of delivery is desired.

* * * * *